United States Patent [19]

Kobayashi

[11] Patent Number: 4,796,108

[45] Date of Patent: Jan. 3, 1989

[54] MAGNETIC RECORDING/REPRODUCING APPARATUS

[75] Inventor: Jun Kobayashi, Katsuta, Japan

[73] Assignee: Hitachi, Ltd., Tokyo, Japan

[21] Appl. No.: 83,164

[22] Filed: Aug. 10, 1987

[30] Foreign Application Priority Data

Aug. 11, 1986 [JP] Japan .................................. 61-186825

[51] Int. Cl.⁴ .............................................. H04N 5/78
[52] U.S. Cl. ..................................... 360/37.1; 360/33.1
[58] Field of Search ............................ 360/33.1, 37.1; 358/319

[56] References Cited

U.S. PATENT DOCUMENTS 4,631,603  12/1986  Ryan .................................. 360/37.1
4,743,979   5/1988  Okano et al. ...................... 360/10.1

Primary Examiner—Eugene R. LaRoche
Assistant Examiner—David Mis
Attorney, Agent, or Firm—Antonelli, Terry & Wands

[57] ABSTRACT

A magnetic recording/reproducing apparatus, in which a video signal is recorded on and reproduced from a magnetic tape by helical scanning with a plurality of rotary magnetic heads, comprises a field memory storing a one-field portion of the video signal in accordance with an address signal, a circuit generating a control signal controlling memory read/write operations, a circuit generating a substituting signal substituting a predetermined period of the output signal of the field memory, and a circuit for setting the period of substitution, so that the substitution starting position is changed over in synchronism with the timing of starting the write operation.

7 Claims, 3 Drawing Sheets

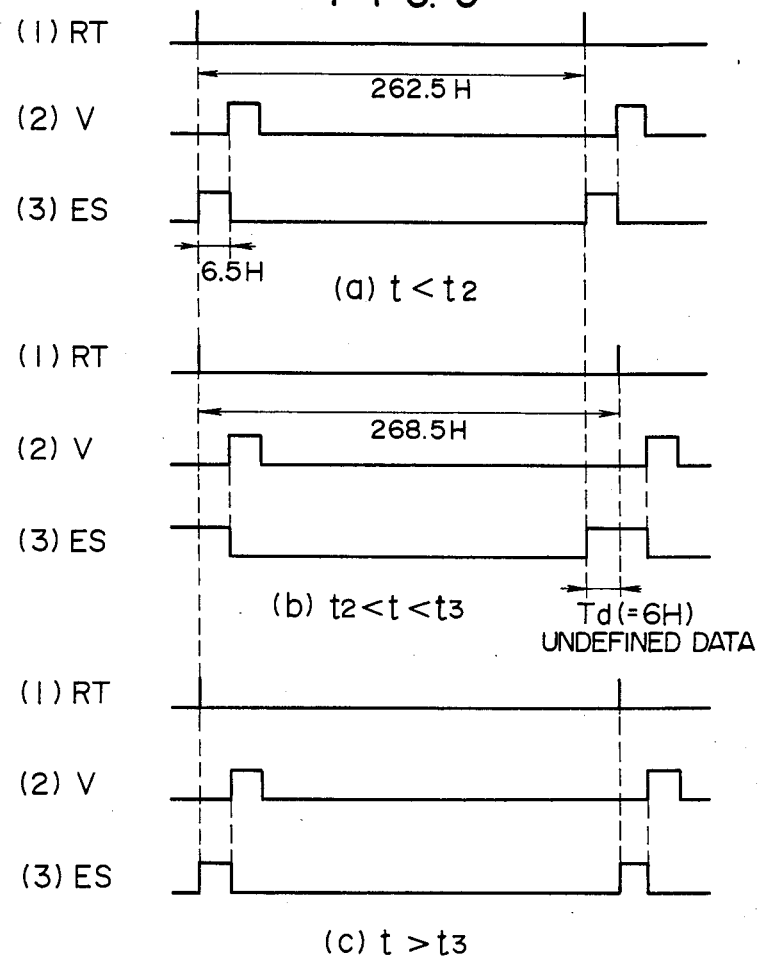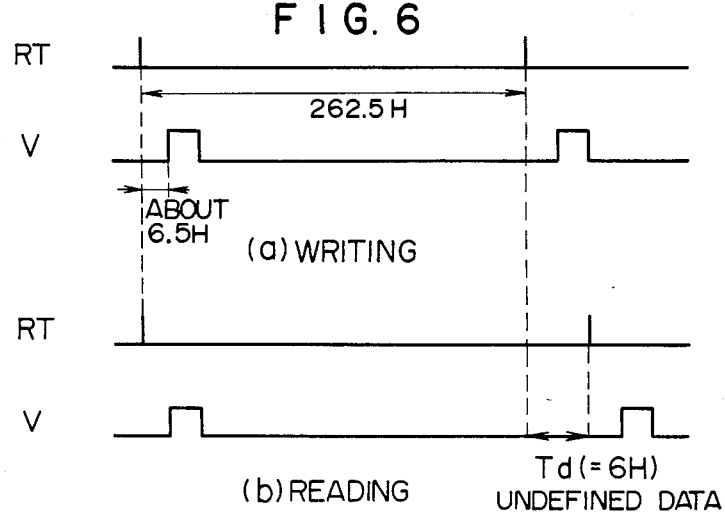

MAGNETIC RECORDING/REPRODUCING APPARATUS

BACKGROUND OF THE INVENTION

This invention relates to a magnetic recording/reproducing apparatus, and more particularly to an apparatus of the kind described above which comprises a field memory so as to improve various special playback functions of the apparatus.

A magnetic recording/reproducing apparatus comprising three magnetic heads and one field memory for realizing various special playback modes including a still picture playback mode, a slow motion playback mode and a fast forwarding playback mode is disclosed in the specification and drawings of Japanese Patent Application No. 61-186825 (1986), on the basis of which U.S. application Ser. No. 047217 was filed May 8, 1987 (Korean patent application was filed on May 7, 1987). By the incorporation of the field memory in the disclosed magnetic recording/reproducing apparatus, pictures of various special playback modes can be satisfactorily reproduced with greatly reduced noise in spite of the fact that only three magnetic heads are mounted on a rotary cylinder. For example, reproduction according to the still picture playback mode can be attained by writing a video signal of a desired field in the field memory and continuously reading out the video signal from the memory. Also, reproduction according to the slow motion playback mode can be attained by sequentially writing a video signal of noise-free fields in the field memory and continuously reading out the written information from the field memory until the magnetic heads are moved to scan succeeding noise-free fields. Further, in the case of reproduction according to the fast forwarding playback mode, the magnetic heads forming a double-azimuth head pair for one channel operate to write a continuous video signll in the field memory, and, after change-over of the channel to the other, the continuous video signal written by the double azimuth head pair is read out from the field memory.

Therefore, a picture having a satisfactory quality free from noise and fluctuation can be reproduced according to such a special playback mode. However, the prior art magnetic recording/reproducing apparatus has not been still fully satisfactory in that the fact that the period of an address reference signal changes at the transient time of mode change-over is no taken into consideration, and out-of-vertical synchronization tends to occur when an address reset signal is merely changed over in response to the mode change-over. The prior art problem will be described with reference to FIG. 6. FIG. 6 shows the relation between the phase of such reference signal RT and that of a vertical synchronizing signal V during the field-memory writing and reading operations. The reference signal RT is used as a basic signal for controlling a servo system driving a cylinder motor or a capstan motor, and the vertical synchronizing signal V is added to a video signal read out from a magnetic tape or the field memory. These two signals RT and V are synchronized by the function of a servo block and are locked to maintain a phase difference therebetween of about 6.5H (horizontal period) as shown. That is, in the writing operation, the address signal appears at time earlier by 6.5H than a pulse of the vertical synchronizing signal V, and a digital video signal corresponding to one field between that pulse and the next pulse of the vertical synchronizing signal V is written in the field memory. On the other hand, in the reading operation, the same phase relationship as that in the writing operation is maintained between the signals RT and V when the playback mode is maintained at one of the special playback modes. However, when the playback mode is changed over to another during the reading operation, the phase relationship between the two signals RT and V changes from that established in the writing operation. Herein, the change-over of the playback mode to another during the reading operation refers to the case where a video signal is held in a transient state. That is, the memory is placed in its readable state immediately before the playback mode is changed over to another, and the playback mode is then changed over. Since the period of the reference signal changes depending on the selected playback mode, the phase relationship between the two signals RT and V in the reading operation differs from that used in the writing operation. Various cases are considered to occur as a result of suhh a mode change-over. For example, the problem of out-of-vertical synchronization on the displayed picture occurs when the speed of the magnetic tape is changed from a high speed to a low speed. (Herein, it is defined that the tape speed is high when the magnetic tape travels in the positive direction.) An example of the above case is the change-over from the normal playback mode to the reverse review (search) mode. In the reverse review mode in which the tape speed is three times as high as that in the normal playback mode, the period of the reference signal RT is extended from 262.5H to 268.5H. That is, the video signal stored in the field memory is read out at the period of 268.5H in the reading operation. However, the signal corresponding to 262.5H only is written in the field memory, and an undefined data is generated from the field memory in the remaining period of 6H. Depending on the value of the undefined data, a synchronizing signal separating circuit in a television receiver may mistake the data as the vertical synchronizing signal. In such a case, out-of-vertical synchronization resulting in vertical jitter of the displayed picture occurs.

SUMMARY OF THE INVENTION

It is anoobject of the present invention to provide a magnetic recording/reproducing apparatus which obviates the possibility of occurrence of out-of-synchronization even when a video signal is held in a transient period of mode change-over.

The present invention which attains the above object notes the fact that an undefined data period in which an undefined data appears is determined dependnng on the operation mode of a magnetic recording/reproducing apparatus, and a substituting or replacement signal of a predetermined level which is not misidentified as a vertical synchronizing signal is generated by a signal blanking circuit ss part of a video signal to blank the undefined data appearing in the undefined data period depending on the operation mode of the magnetic recording/reproducing apparatus.

BRIEF DESCRIPTION OF THE DRAWINGS

FIGS. 5(a), 5(b) and 5(c) show various signal waveforms before and after a mode change-over.

FIGS. 6(a) and 6(b) are timing charts showing the relation between a reference signal and a vertical synchronizing signal in the reading operation and writing operation, respectively.

DESCRIPTION OF THE PREFERRED EMBODIMENT

Figure 1:
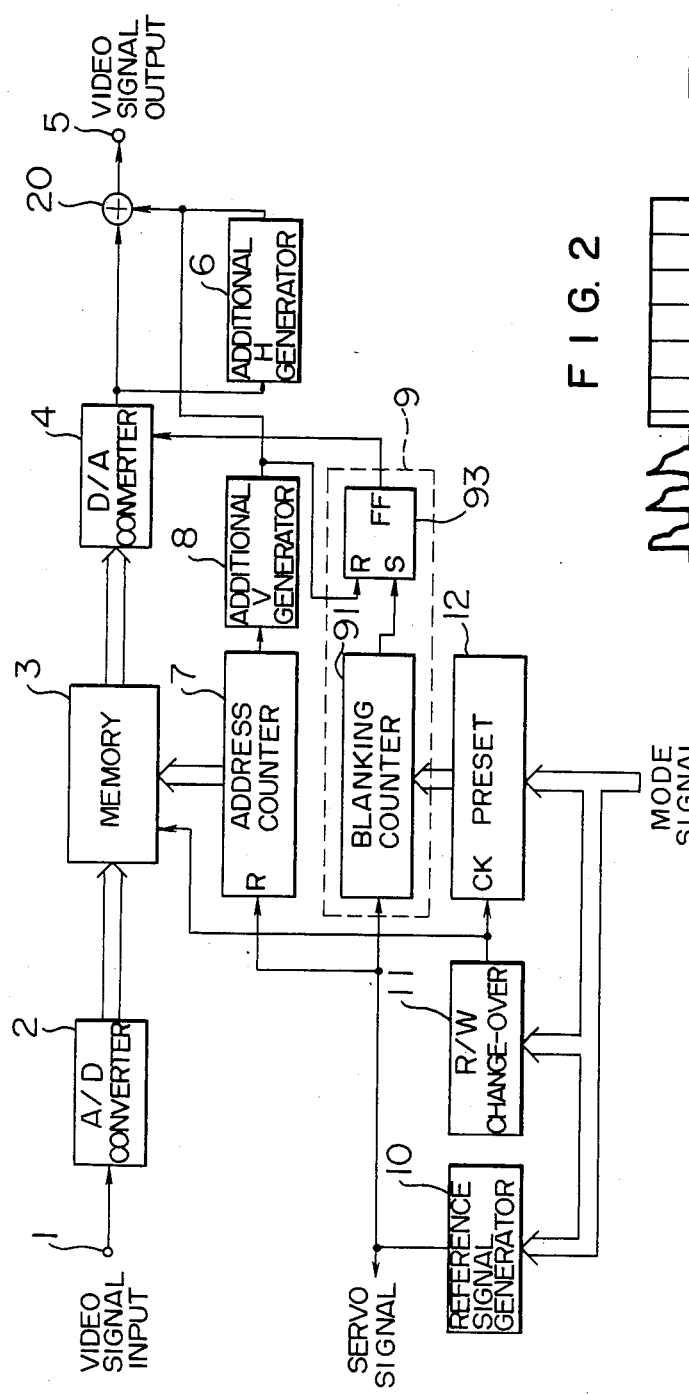
FIG. 1 is a block diagram showing the structure of an embodiment of the present invention.

Referring to FIG. 1, a video signal read out from a magnetic tape by magnetic heads is applied to an input terminal 1. The video signal is converted into a digital signal by an A/D converter 2, and the digital signal is written in a field memory 3. The digital signal read out from the field memory 3 is converted into an analog signal by a D/A converter 4, and the analog signal is applied to an adder 20 where a horizontal synchronizing pulse from an additional H generating circuit 6 and a vertical synchronizing pulse from an additional V generating circuit 8 are added to the analog signal. The resultant signal appears from an output terminal 5 as a video signal including such synchronizing pulses. The additional H generating circuit 6 is phase locked by the horizontal synchronizing signal applied from the D/A converter 4 and generates the additional pulse synchronized with the horizontal synchronizing signal in the period such as the vertical blanking period in which the horizontal synchronizing signal disappears.

A reference signal RT for actuating a servo system driving a cylinder motor and a capstan motor is applied to an address counter 7 from a reference signal generating circuit 10. The address counter 7 applies a pulse generation start signal to the additional V generating circuit 8 which generates the pulse having a pulse width of 3H at time 6.5H later than the time at which the reference signal RT is applied thereto. The address counter 7 also applies a writing and reading address signal to the field memory 3. An R/W change-over circuit 11 generates an R/W signal for maintaining the field memory 3 in a readable or writable state.

A mode signal indicative of an operation mode such as a still picture playback mode, a slow-motion playback mode or a fast-forward playback mode is applied to the reference signal generating circuit 10 and R/W change-over circuit 11, and the reference signal RT and the read signal or write signal corresponding to the operation mode indicated by the mode signal are generated from the reference signal generating circuit 10 and R/W change-over circuit 11 respectively. The mode signal is also applied to a preset circuit 12, and a preset signal corresponding to the operation mode indicated by the mode signal is generated from the preset circuit 12.

Figure 2:
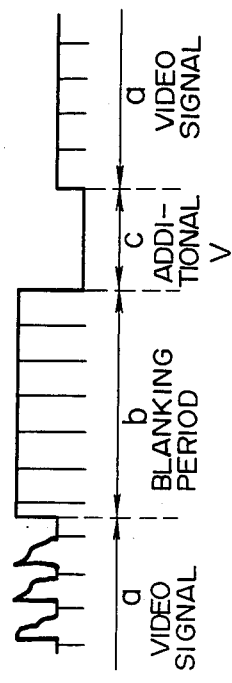
FIG. 2 is a waveform diagram of a video signal.

The video signal appearing from the video signal output terminal 5 has a waveform in the neighborhood of its vertical synchronizing signal, as shown in FIG. 2. In the video signal period a in FIG. 2, the D/A converted signal itself appears. The starting position of the blanking period b is determined by a blanking circuit 9, and the blanking period b lasts until the additional V signal appears. In the illustrated embodiment, the analog output of the D/A converter 4 is set at a constant gray level close to the white level. When this gray level is selected to be closer to the white level than the pedestal level, the blanking period b is not misidentified as a vertical synchronizing signal by a television receiver.

Thus, when the blanking period b is appropriately determined to mask the period of time of appearance of an undefined data from the field memory 3, out-of-synchronization does not occur in the transient period of mode change-over. However when the synchronizing signal is completely removed in the blanking period b, disturbance occurring in the horizontal synchronizing circuit of the television receiver will result in appearance of skew in an upper part of the displayed picture. To prevent such a trouble, the additional H signal isaapplied in the blanking period b. This additional H generating circuit 6 is provided by a PLL circuit which is locked to the phase of the horizontal synchronizing signal in the D/A converted video signal. Therefore, even when the horizontal synchronizing signal may temporarily disappear due to application of noise or appearance of an undefined data from the memory 3, the phase of the additional H signal is maintained at the phase of the horizontal synchronizing signal previously applied to the additional H generating circuit 6 from the D/A converter . In the V addition period c, the additional V signal is generated from the additional V generating circuit 8 in synchronism with the address signal so as to prevent vertical jitter of the displayed picture. The additional H signal and the additional V signal are added to the D/A converted video signal fixed at the sync tip level.

Figure 3:
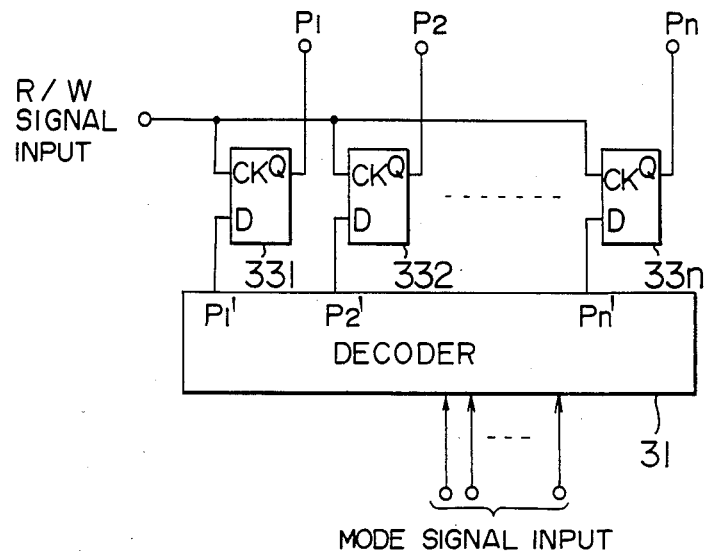
FIG. 3 is a bloc diagram showing the internal structure of the pre-set circuit shown in FIG. 1.

How to determine the blanking period b will now be described with reference to FIGS. 3 to 5. As described already, the starting position of the blanking period b is determined by the blanking circuit 9, and the terminating position of the blanking period b is determined by the additional V signal. The blanking circuit 9 is composed of a blanking counter 91 and a flip-flop 93, and the count of the blanking counter 91 is determined by the preset circuit 12. FIG. 3 shows the basic structure of the preset circuit 12. It will be seen in FIG. 3 that the preset circuit 12 is composed of a decoding circuit 31 decoding the mode signal to determine preset values $P_1$, $P_2, \ldots, P_n$ and a plurality of flip-flop 331, 332, ..., 33$n$ whose outputs are synchronized with the leading edge of the write signal.

For example, in the case of the normal playback mode, an output of "H" level appears at an output terminal $P_1'$ of the decoding circuit 31, while outputs of "L" level appear at other output terminals $P_2'$ to $P_n'$, and the flip-flop 331 is selected. An output of "H" level appears at an output terminal $P_1$ among plural output terminals $P_1$ to $P_n$, and a value corresponding to 262.5H is selected as a count setting of the blanking counter 91. Each time the reference signal RT is applied, the blanking counter 91 counts the value corresponding to 262.5H thereby setting the flip-flop 93. The D/A converted output signal of the D/A converter 4 is forcedly maintained at the gray level until the flip-flop 93 is rsset by the vertical synchronizing pulse applied from the additional V generating circuit 8. In the case of the normal playback mode, the output of the magnetic heads is generally used as usual. However, the output of the memory 3 is used together with the forced gray level at the beginning (from time $t_1$ to time $t_2$ in FIG. 4) of the transient period of the mode change-over.

In the case of another playback mode, for example, the triple-speed reverse review mode, the output $P_2$ of the flip-flop 332 is selected, and a value corresponding to 268.5H is selected as the count setting of the blanking counter 9. In this case, the gray level is generated until the vertical synchronizing pulse is applied at time 268.5H later than the time of application of tee reference signal RT.

In each of the flip-flop 33₁ to 33n, the level at its terminal D appears at its terminal Q in response to the application of an "L" level (the write signal) to its terminal CK. Therefore, even when the mode is changed over to another during the reading operation, the preset values $P_1$ to $P_n$ are maintained until the first write instruction is applied.

Figure 4:
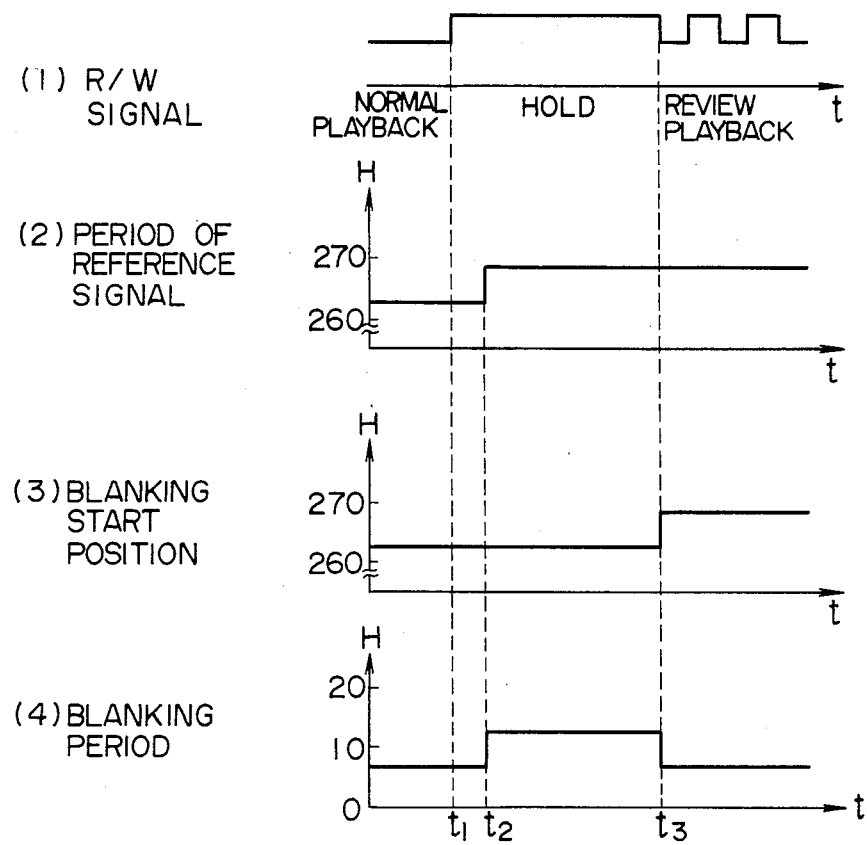
FIG. 4 shows signal waveforms appearing at various parts of FIG. 1.

FIG. 4 illustrates the practical operation of the system in the case of chnnge-over from the normal playback mode to the triple-speed back-motion search playback mode. FIG. 4 shows in (1) the level of the R/W signal. In the reading operation, the R/W signal is in its "H" level. Before time $t_1$, the mode is the normal playback mode in which the output of the magnetic heads is used. In the picture hold mode between time $t_2$ and time $t_3$, the output of the memory 3 is used. In the search playback mode after time $t_3$, change-over between the reading operation and the writing operation occurs every field for attaining noiseless picture reproduction. FIG. 4 shows in (2) the change in the period of the reference signal RT. After holding the picture, the mode is changed over at time $t_2$, and the period of the reference signal RT changes to 258.5H from 262.5H. Therefore, an undefined data corresponding to 6H appears from the memory 3 from time $t_2$ to time $t_3$ FIG. 4 shows in (3) the blanking starting position. The period of time of generation of the blanking signal after the application of the reference signal RT changes at time $t_3$ from 262.5H to 258.5H. Therefore, the undefined data is masked between time $t_2$ and time $t_3$, and out-of-synchronization does not occur. FIG. 4 shows in (4) the blanking period. Although this time period is set at 6.5H before time $t_2$ and after time $t_3$, it is longer or set at 12.5H between time $t_2$ and time $t_3$.

FIG. 5 is another expression of the chart shown in FIG. 4. FIG. 5 shows in (), (b) and (c) the relation among the signal RT, the signal V and the blanking period ES when $t<t_2$, $t_2<t<t_3$, and $t>t_3$, respectively.

It can be seen that the undefined data output of the memory 3 is masked or blanked at $t_3<t<t_2$.

I claim:

1. A magnetic recording/reproducing apparatus comprising:
    a field memory storing a signal portion corresponding to predetermined one field of a video signal read out from a magnetic tape by magnetic heads;
    means for reading out a video signal from said field memory;
    first adding means for adding a vertical synchronizing pulse to the output signal of said reading means;
    substituting means for substituting a portion of the memory output signal, generated in a predetermined period immediately before the addition of the vertical synchronizing pulse, by a substituting signal having a level closer to the white level than the pedestal level; and
    second adding means for adding a horizontal synchronizing pulse to the substituted predetermined period of the video signal.

2. A magnetic recording/reproducing apparatus according to claim 1, further comprising means for generating a reference signal having a field period for controlling a servo system, said reading means generating a reading address signal on the basis of the reference signal, and said substituting means generating the substituting signal having the level closer to the white level than the pedestal level after lapse of a predetermined period of time from the time of application of the reference signal and until said substituting means is reset by the vertical synchronizing pulse appiied from said first adding means.

3. A magnetic recording/reproducing apparatus according to claim 2, wherein said substituting means includes counter means starting its counting operation in response to the application of the reference signal, and signal generating means generating the substituting signal when the count of said counter means attains a predetermined value and ceasing to generate the substituting signal in response to the application of the vertical synchronizing pulse.

4. A magnetic recording/reproducing apparatus according to claim 3, wherein said substituting means further includes means for setting the predetermined value of said signal generating means according to the operation mode of said magnetic recording/reproducing apparatus.

5. A magnetic recording/reproducing apparatus according to claim 4, wherein said setting means sets the predetermined value in response to the application of a write signal to said field memory.

6. A magnetic recording/reproducing apparatus according to claim 1, wherein said second adding means includes a phase-locked loop (PLL) circuit phase-locked by the horizontal synchronizing signal in the video signal read out from said field memory.

7. A magnetic recording/reproducing apparatus comprising:
    an analog-to-digital (A/D) converter converting output signals of magnetic heads into a digital signal;
    a field memory in which the digital output signal of said A/D converter is written;
    a digital-to-analog (D/A) converter converting the digital signal read out from said field memory into an analog signal;
    an address counter applying a writing address signal and a reading address signal to said field memory in response to hhe application of a reference signal used for controlling a servo system driving various elements including a head cylinder motor and a capstan motor;
    vertical pulse adding means generating a vertical synchronizing pulse and adding the pulse to the analog signal when said address counter generates a predetermined reading address signal;
    blanking means for forcedly changing the leve of the output signal of said D/A converter to a predetermined level closer to the white level than the pedestal level after a predetermined period of time has elapsed from the time of application of the reference signal and until the vertical synchronizing pulse is generated; and horizontal pulse adding means for adding a horizontal synchronizing pulse to the signal of the predetermined level set by said blanking means.

* * * * *